(12) United States Patent
Marshall

(10) Patent No.: US 8,134,285 B2
(45) Date of Patent: Mar. 13, 2012

(54) SHAPED SELECTIVE THERMAL EMITTER

(76) Inventor: Robert A Marshall, Georgetown, TX (US)

(*) Notice: Subject to any disclaimer, the term of this patent is extended or adjusted under 35 U.S.C. 154(b) by 1096 days.

(21) Appl. No.: 11/961,639

(22) Filed: Dec. 20, 2007

(65) Prior Publication Data

US 2009/0160303 A1 Jun. 25, 2009

(51) Int. Cl.
*H01J 5/16* (2006.01)
*H01J 61/40* (2006.01)
*H01J 11/00* (2006.01)

(52) U.S. Cl. ........ 313/113; 313/567; 313/110; 313/111; 313/112; 313/116

(58) Field of Classification Search .......... None
See application file for complete search history.

(56) References Cited

U.S. PATENT DOCUMENTS

| | | |
|---|---|---|
| 6,611,085 B1 | 8/2003 | Gee et al. |
| 6,768,256 B1 | 7/2004 | Fleming et al. |
| 7,085,038 B1 | 8/2006 | Etheridge et al. |
| 7,794,538 B2 * | 9/2010 | Marshall ............ 117/4 |
| 8,003,280 B1 * | 8/2011 | Marshall ............ 430/1 |
| 2004/0239228 A1 * | 12/2004 | Perlo et al. ............ 313/341 |
| 2006/0071585 A1 * | 4/2006 | Wang ............ 313/315 |
| 2006/0170334 A1 | 8/2006 | Etheridge, III et al. |
| 2006/0196407 A1 | 9/2006 | Etheridge, III et al. |
| 2007/0228951 A1 * | 10/2007 | Sommerer et al. ............ 313/569 |

OTHER PUBLICATIONS

Ivan Celanovic, David Perreault, and John Kassakian, "Resonant-cavity enhanced thermal emission", Physical Review B 72, 075127 (2005), DOI: 10.1103/PhysRevB.72.075127.

* cited by examiner

*Primary Examiner* — Natalie Walford

(57) ABSTRACT

A geometrically shaped photonic crystal structure consisting of alternating layers of thin films is heated to emit light. The structure may include index matching layers or a cavity layer to enhance emissions. The layer thicknesses of the structure may be spatially varied to modify the emission spectrum versus emission angle. The self-focusing structure may be fabricated into a convex electrically heated wire filament light bulb, a concave visible thermophotovoltaic emitter, a concentric directional heat exchanger, an electronic display, or a variety of irregularly shaped remotely read temperature or strain sensors.

29 Claims, 11 Drawing Sheets

SHAPED SELECTIVE THERMAL EMITTER

RELATED APPLICATIONS

This application claims the priority benefit of U.S. application Ser. No. 11/961639, entitled "Shaped Selective Thermal Emitter", filed Dec. 20, 2008.

TECHNICAL FIELD OF THE INVENTION

The invention relates to a geometrically-shaped wavelength-selective thermal emitter, more specifically to a visible light source, self-focusing thermophotovoltaic emitter, heat exchanger, electronic display, and sensor.

BACKGROUND OF THE INVENTION

Today's incandescent lighting is only about 5% efficient, yet enjoys a dominant market share due to a very low cost. A need has arisen for a high efficacy, low cost, non-toxic, fixture compatible, high quality light source. Various technologies have attempted to fill this need, but all have failed in at least one way or another. For example, U.S. Pat. No. 6,768,256 "Photonic crystal light source" and U.S. Pat. No. 6,611,085 "Photonically engineered incandescent emitter" disclose a woodpile PBG, which is a 3D layer by layer structure. The thermally stimulated PBG emitter has a significant increase efficiency over a black-body emitter. But, this woodpile approach requires an expensive enhanced state-of-the-art semiconductor fab for manufacture, hardly suited to commodity lighting. U.S. Pat. No. 7,085,038 "Apparatus having a photonic crystal" disclosed an inverse opal PBG, which is a 3D colloidal structure. Although the colloidal method reduces the cost, it is still costly to manufacture and the quality of the opal is difficult to maintain using the methods disclosed.

Another PBG structure has been disclosed in Ivan Celanovic, David Perreault, and John Kasskian, "Resonant-cavity enhanced thermal emission", Physical Review B 72,075 (2005), DOI: 10,1103/PhysRevB, 72,075127, Notably, this structure incorporates a 1D PBG structure, a thermal cavity, and a mirror. The PBG structure is composed of alternating layers of 0.17 μm thick silicon and 0.39 μm thick silicon dioxide. The thermal cavity, composed of a 0.78 μm thick silicon dioxide, is a defect in the PBG and increases the emissivity of the device. The mirror is composed of tungsten or silver. Results show quasi-monochromatic thermal emission in the IR and 2.4 μm and good directivity. Only planar structures are disclosed.

ThermoPhotoVoltaic (TPV) electric generation offers the potential to recover vast amounts of waste heat, yet has failed to operate at reasonable efficiency or have a reasonable cost. PBG emitters have been proposed to increase the spectral efficiency of the thermal emitter in the TPV system. Also, photonic heat pumps have not yet been commercially realized due to cost/performance issues. A need has arisen for a narrow band thermally driven focused light source.

Electronic displays suffer from high cost, low brightness, poor contrast, perceptive color aberrations due to edge effects color combining of red, green, and blue pixels, various effects of backlighting, and failure of a main light source. A need has arisen for low cost, emissive displays.

Temperature and strain sensors are frequently limited due to; size, operating environment, resolution due to few measuring points and sensor size, multiplexing a larger number of measurement points, or connectivity issues due to movement of the point to be measured, electrical noise, and number of connections. Thus a need has arisen for tiny, remotely readable, rugged sensors.

Although Photonic Band Gap (PBG) technologies hold promise in all of these applications, they have been severely limited due to the choice of the desired structure, the manufacturability of the structure, and the cost of making the structure.

Traditional black body emitters are essentially isotropic. The light pattern is essentially determined by the shape of the fixture or bulb.

SUMMARY OF THE INVENTION

A geometrically-shaped spectrally-shaped thermal emitter is disclosed. The geometry of the emitter is key to many applications and fabrication thereof. Of special importance is that the directivity of the emitter coupled with the geometric shape of the emitter results in a self-focusing light emitter. Thus, unlike previous light sources, a separate reflector or lensing element is not required to produce a desired spatial light distribution.

A high efficiency light source is disclosed, including a 1D PBG structure deposited on a wire substrate. Use of a wire substrate has several key advantages, including low-cost reel-to-reel processing, spatial integration of the directivity of a PBG light source, and compatibility with existing commodity manufacturing processes, bulbs, sockets, and fixtures. Use of a PBG structure allows shaping of the thermal emission spectra, without the use of hazardous materials, such as Mercury. Use of a 1D PBG structure, with or without a cavity, allows the simplicity and cost effectiveness of thin-film processing. A further advantage of a 1D structure is that the center emission wavelength is a function of layer thickness; a gradient in the thickness allows easy profiling of the emission spectra. A spatial gradient in PBG wavelength is essentially impossible with colloidal techniques. Modification of color temperature and color rendering are as simple as changing the thickness gradient.

A TPV generator is disclosed, including a concave PBG emitter. The 1D PBG emitter is simple and cost-effective to manufacture. Also, PBG emitters are directional. This provides a key advantage in providing a self-lensing effect, optically concentrating the power density on the PV cell. This is advantageous as the power per area of PBG emissions may be considerably lower than the power handling capability of commercial PV cells.

An electronically tunable PBG is disclosed. One of the PBG materials is replaced with a piezoelectric material. Application of a voltage changes the resonant wavelength of the structure. Again, the PBG is thermally stimulated to emit light. Optionally, this structure may not be heated and operated in a reflective or transmissive mode. A pixilated pattern is etched into the PBG on a flexible substrate. This arrangement has the advantage of a single layer of low-cost color-tunable pixels on an emissive flexible display.

Temperature and strain sensors are also disclosed. Use of high CTE materials shifts the central wavelength as a function of temperature. A strain sensor prefers use of higher modulus materials and must be oriented in the direction of applied strain. A 3D PBG may be used in this application to sense elongation. Key advantages include: these sensors may be deposited on irregular shaped surfaces, such as turbine blades: the sensor is read remotely by sensing the emitted wavelength, eliminating effects of electromagnetic interference: is emissive, thus relatively immune to dirt buildup: and requires no electricity or other wiring.

BRIEF DESCRIPTION OF THE DRAWINGS

For a more complete understanding of the invention, and for further features and advantages, reference is now made to the following detailed description, taken in conjunction with the accompanying drawings, in which.

DETAILED DESCRIPTION OF EMBODIMENTS OF THE INVENTION

Figure 1:
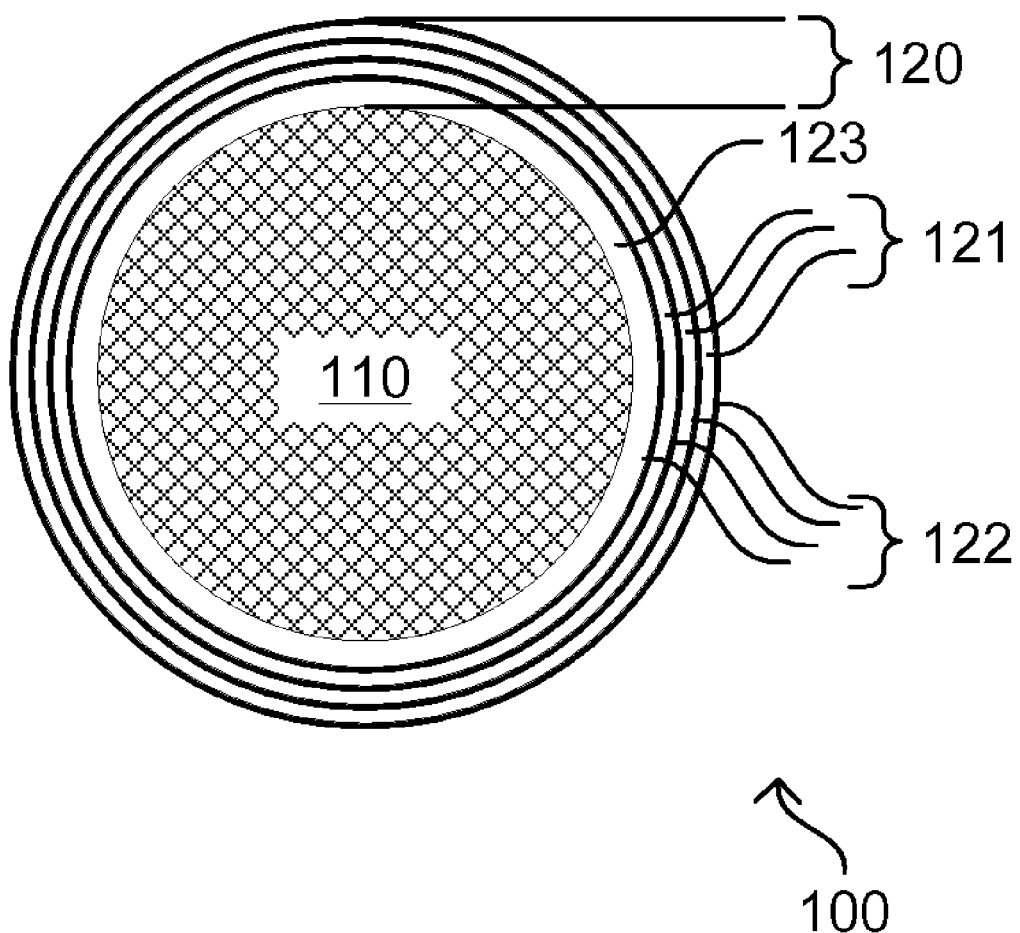
FIG. 1 is a diagram illustrating a cross section of a filament of a selective thermal emitter.

Embodiments of the present invention and their advantages are best understood by referring to FIGS. 1 through 10 of the drawings, in which like numerals refer to like parts. The figures are not to scale, especially the apparent thickness of the thin films FIG. 1 is a diagram illustrating a cross section of a filament 100 of a selective thermal emitter. Substrate 110 is a metallic wire or other filamentous substrate capable of resistively heating PBG 120 to emit light. Refractory metals are preferred for their melting point and low diffusion. Alternatively, a non-conductive material may be used for substrate 110 and PBG 120 itself is resistively heated. Use of a wire substrate has several key advantages, including low-cost reel to reel processing, integration of the directivity of a PBG light source, no light intensity non-uniformity or radiative losses from the backside of a planar structure, and compatibility with existing commodity manufacturing processes, bulbs, sockets, and fixtures.

PBG 120 consists of a multitude of thin film layers of low dielectric 121 and high dielectric 122 forming a ID PBG structure. Optionally, a well-known defect layer 123 is added to enhance thermal emissivity in conjunction with a high reflectivity substrate. Only 8 layers are shown as an example. PBG 120 need not actually possess a photonic band gap. A Photonic Crystal is sufficient (for this embodiment and all alternate embodiments), as it modifies the photonic density of states within the structure, and thus shapes the thermal emission spectrum. This structure has the advantage of low-cost thin film processing. Alternatively, PBG 120 may employ a 2D or 3D PBG structure.

Low dielectric 121 and high dielectric 122 are selected for a high contrast in dielectric function, to give the best spectral shaping; material stability at operating temperature, no melting, no alloying, no chemical decomposition; and a matched CTE, to avoid layer de-lamination. A key advantage is operating temperature of a selective emitter is much less than for an equivalent lumen output of a black body. This allows a much broader selection of materials and a much longer emitter life. For illustrative purposes, some materials which meet these criteria and associated advantages are: Silicon/Alumina for low CTE; Titanium Dioxide/Magnesia for a high CTE; Titanium Dioxide/Silicon Dioxide for higher CTE and piezoelectric effects; and Tungsten/Tungsten Carbide for very high temperature operation. Many other materials are readily envisioned for use in particular applications or to give particular performance.

Figure 2:
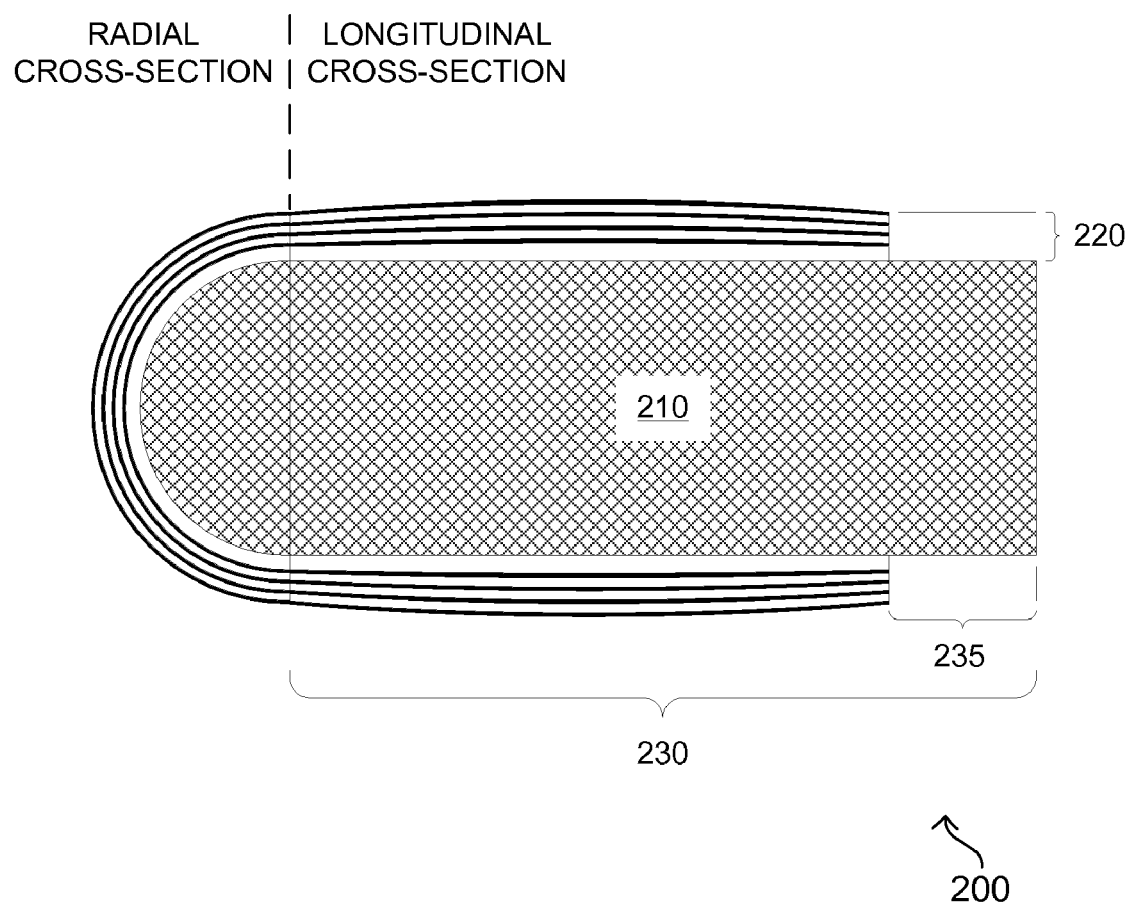
FIG. 2 is a perspective diagram illustrating a longitudinal cross section of a filament of a tapered selective thermal emitter.

FIG. 2 is a perspective diagram illustrating a longitudinal cross section of a filament of a tapered selective thermal emitter 200. Substrate 210 and PBG 220 are similar to substrate 110 and PBG 120. PBG 220 incorporates a gradient and/or stepped longitudinal variation in layer thickness. The emission wavelength directly scales with layer thickness. The emission bandwidth without any layer thickness variation is relatively narrow. Variation of the layer thickness of a 1D PBG provides a key advantage: the entire emission spectra can easily be changed, as the integral of the emission spectra of each segment. Modification of color temperature and color rendering are as simple as changing the thickness gradient. Various quasi-monochromatic light colors can also easily be produced. Significant variation in the emission spectra of existing fluorescent and LED based sources requires new material systems with years of research to identify these systems. Advantages over a 2D or 3D PBG are the ease of changing lattice constant and a continuously variable lattice constant. Multiple periods of variation 230 may be included on a single filament. Some portion 235 of filament 200 may have a minimal PBG 220, leading to low emissivity segments. An advantage is the adjustment of the total light output of emitter 200.

Figure 3:
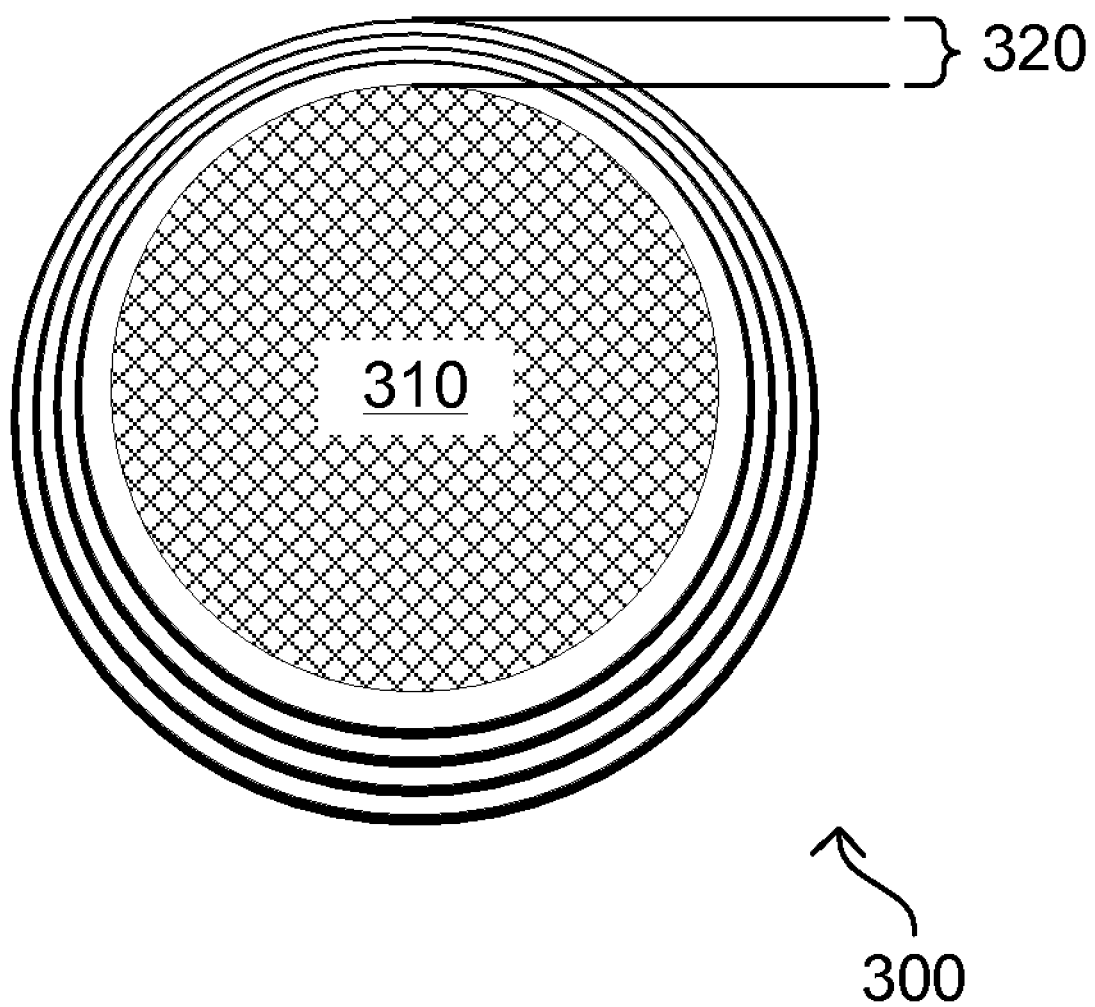
FIG. 3 is a diagram illustrating a cross section of a filament of an offset selective thermal emitter.

FIG. 3 is a diagram illustrating a cross section of a filament of an offset selective thermal emitter 300. Offset emitter 300 is analogous to tapered emitter 200, but with the emission wavelength varied radially instead of longitudinally. Substrate 320 is analogous to substrate 220 and PBG 320 is analogous to PBG 220. Radial variation is accomplished by offsetting the substrate from the material source. Substrate 320 may be coiled or a coil of coils before coating.

Figure 4:
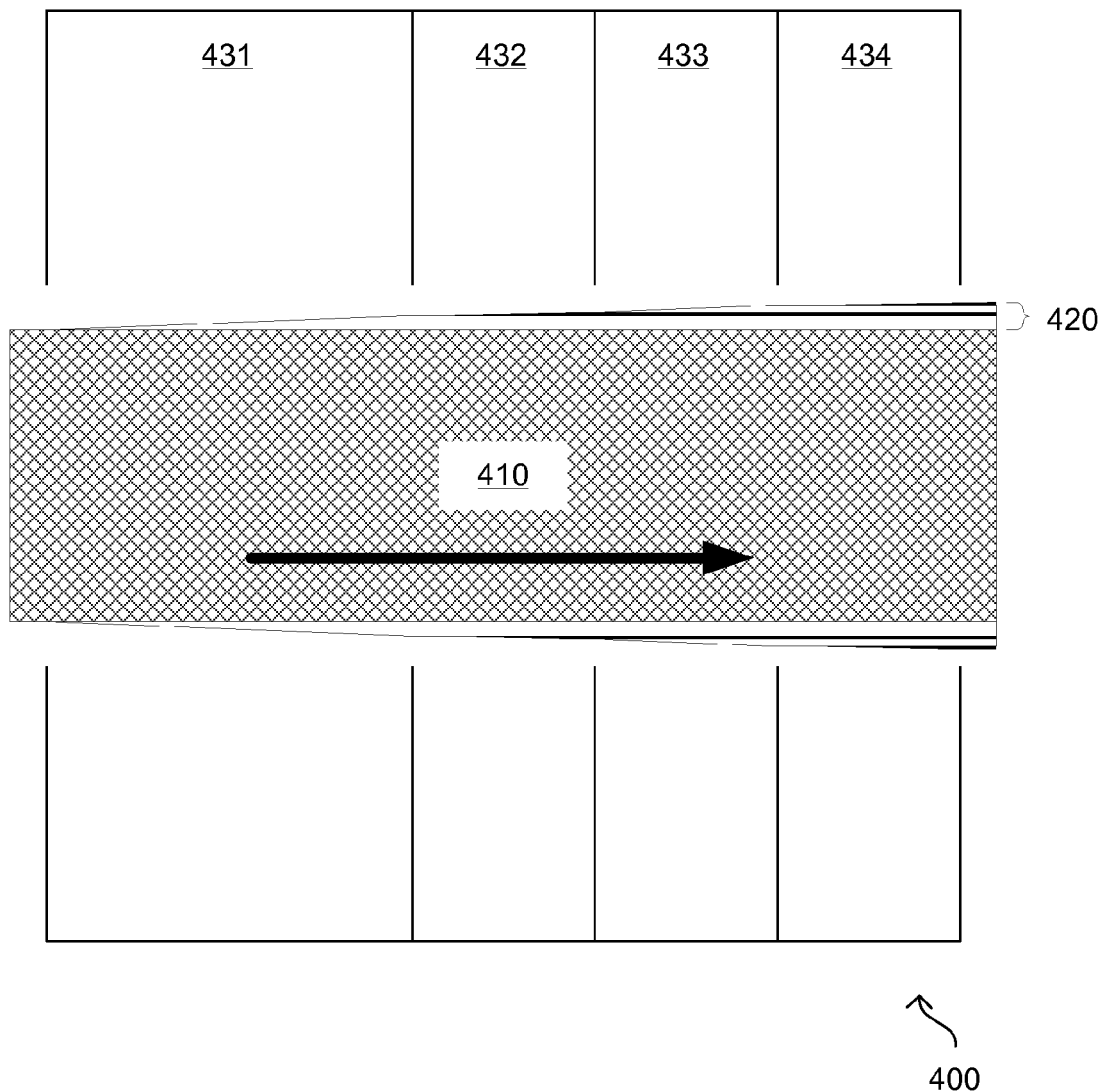
FIG. 4 illustrates an apparatus for reel-to-reel fabrication of a filament.

FIG. 4 illustrates an apparatus 400 for reel-to-reel fabrication of a filament. Multiple deposition chambers 431 to 438 (only 4 are shown for clarity, and 8 layers is only as an example) each deposit one layer of PBG 420 before the substrate 410 is moved to the next chamber. The drawing is not to scale as the chambers are relatively large and the deposited films are very thin. Walls between the chambers each contain one hole only just large enough to allow the filament to pass and to minimize cross contamination between the chambers. Substrate 410 is passed through the chambers in a reel-to-reel fashion. The source and take-up reels are not shown for clarity. Variation in layer thickness, as illustrated with tapered selective thermal emitter 200, is readily accomplished by varying the rate at which substrate 410 is drawn between the chamber segments while keeping the deposition rate constant. Alternatively, the deposition rate may be varied and the feed rate held constant, or any combination in between. The may be varied and the feed rate held constant, or any combination in between. The deposition process may employ well known evaporative deposition, ion beam assisted deposition, chemical vapor deposition, molecular beam epitaxy, sputter deposition, or atomic layer deposition methods. An advantage is large lengths of filament can be made very quickly, very inexpensively, and with minimal user interaction. Furthermore, multiple strands of filaments may be fabricated simultaneously, given enough distance between the strands to ensure an even layer thickness.

Figure 5:
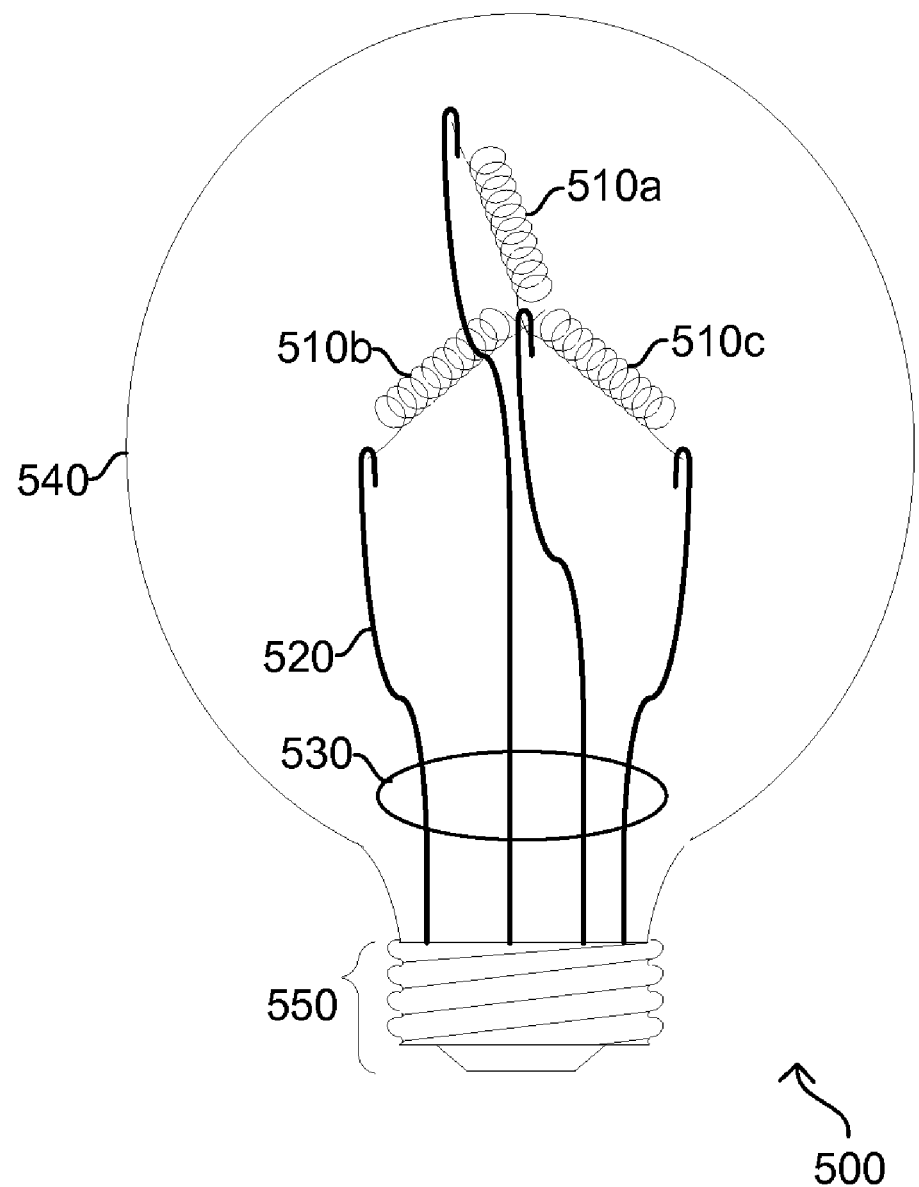
FIG. 5 is a diagram illustrating a screw type light bulb.

FIG. 5 is a diagram illustrating a screw type light bulb 500. Filament 510 is analogous to tapered emitter 200; mounted to filament support wires 520; in stem 530; packaged in an A style or other bulb 540; with Edison or other style base 550. An advantage is compatibility with very common Edison base sockets and fixtures. The advantage is a high efficacy, low cost, non-toxic, fixture compatible, high quality light source.

Optionally, multiple redundant filaments of the same color 510a-c may be packaged in a single bulb. Additional control electronics are required to sense the failure of one filament and switch to a new filament. Optionally, the control electronics are smart and report filament failure via a communications link, monitor used and remaining filament life, and provide dimming or color control functions. Alternatively, any number of filaments of differing color may be packaged together and independently controlled to dynamically change the color output. Electrical connection may be in either a wye, delta, or independent configuration.

Bulb 540 may be plastic. All plastics are permeable to oxygen. In a typical bulb, a hot tungsten filament is very flammable and would be severely life-limited with any oxygen intrusion. Filament 510 may include an outer layer incorporating a ceramic or glass. Hot ceramic or glass is not subject to rapid attack by permeated atmospheric oxygen. Filament 510 may also incorporate a metal, as selective emission allows an operating temperature much lower than a typical black-body emitter.

Figure 6:
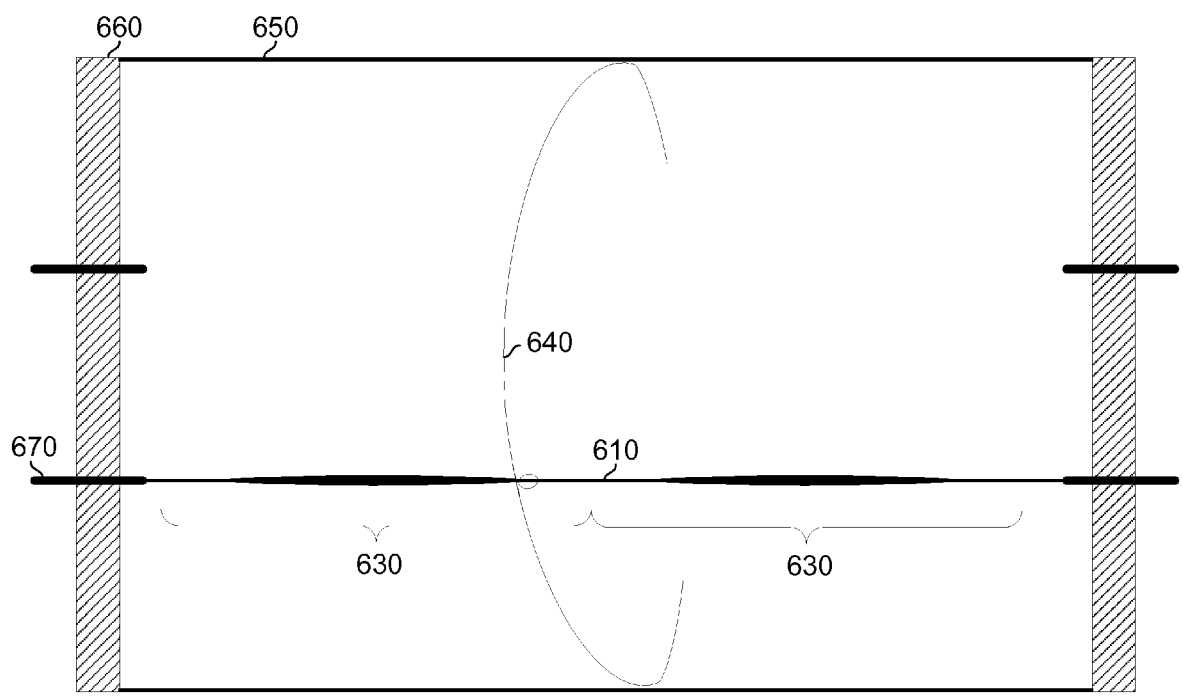
FIG. 6 is a diagram illustrating a light bulb in a tubular package.

FIG. 6 is a diagram illustrating a light bulb in a tubular package 600. Filament 610 with period 630 is analogous to one or more periods 230 of tapered emitter 200; supported along its length by multiple filament support rings 640; packaged in a bulb 650; with end caps 660; and pins 670. Period 630 may have low-emissivity regions to lower the total output power. Bulb 650 may be linear or circular. An advantage is socket compatibility with existing fluorescent bulbs, although the ballast no longer provides a useful function.

Figure 7:
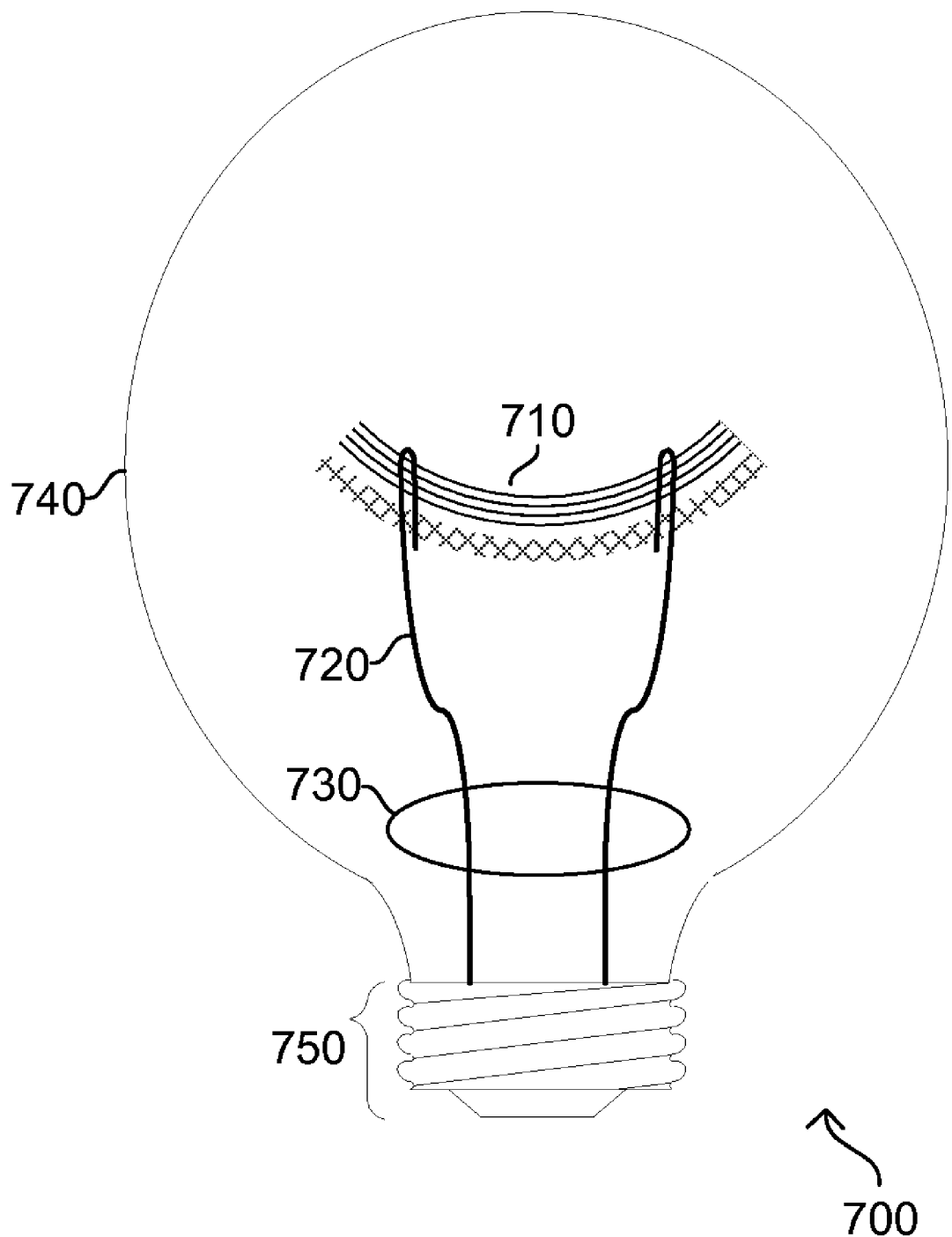
FIG. 7 is a diagram illustrating a directionally focused light bulb.

FIG. 7 is a diagram illustrating directionally focused light bulb 700. Energy is focused into a pattern by the directional emission spectrum and the shape of filament 710. Filament 710 is a rounded ribbon, instead of a wire, to provide the desired light distribution pattern. Although the substrate of filament 710 is already low emittance, the backside may be covered with a low-emissivity coating. Filament 710 is mounted to filament support wires 720; in stem 730; packaged in bulb 740; with Edison or other style base 750. Several key advantages exist over well known Parabolic Aluminized Reflector (PAR) bulbs: the PBG provides a spectrally shaped emission, efficacy is much higher; and the PBG emissions are directional, thus a reflector is not required, allowing use of much cheaper commodity A style packaging.

Figure 8:
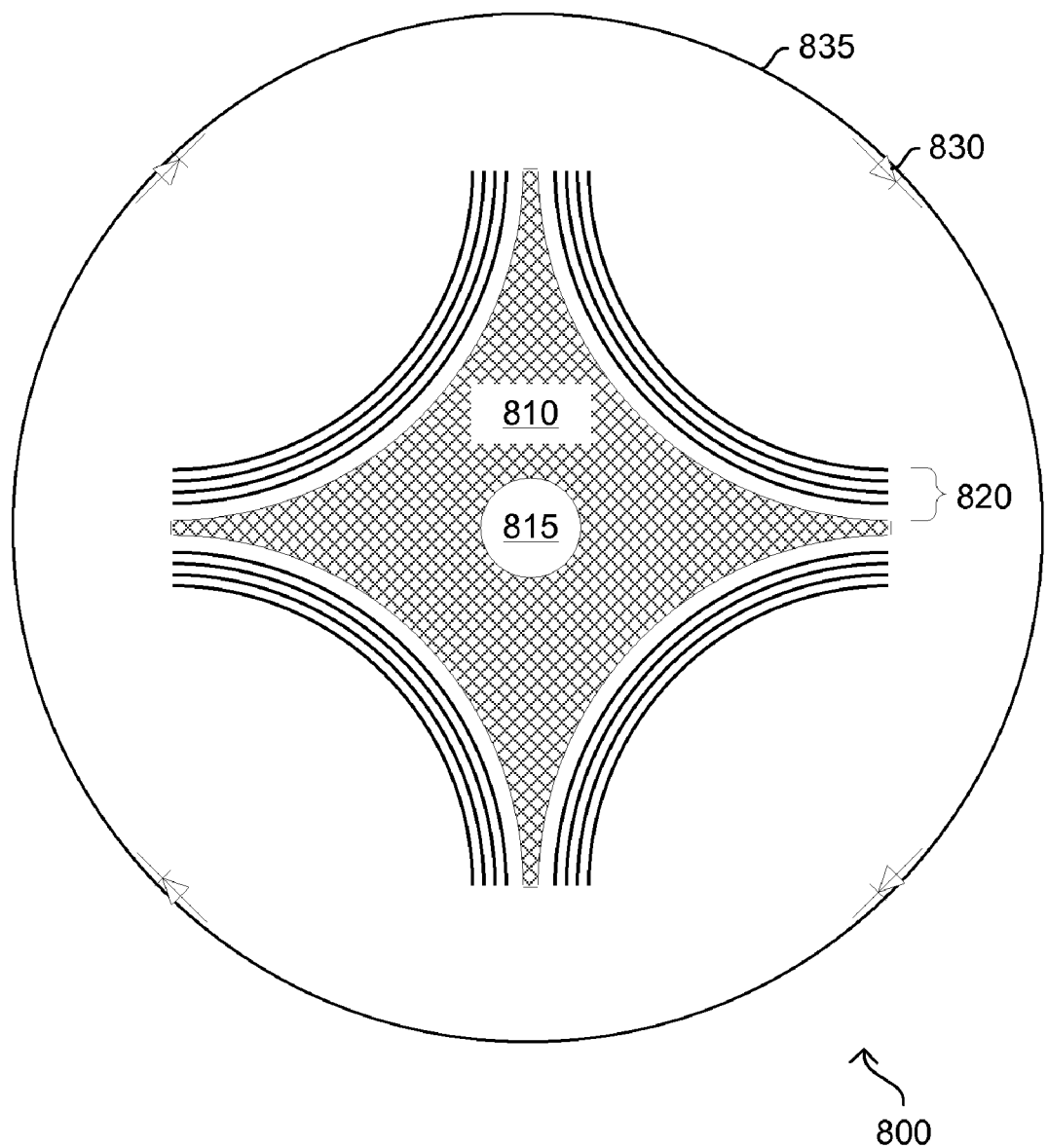
FIG. 8 is a diagram illustrating a cross section of a focused selective thermal emitter.

FIG. 8 is a diagram illustrating a cross section of a focused selective thermal emitter 800. Substrate 810 is heated by a heat source from tube 815 and uniformly heats PBG 820. Radiated emissions from PBG 820 are predominantly normal to the substrate. The shape of substrate 810 focuses the radiated emissions from PBG 820 onto PV cell 830 without any optical elements other than the shape of the emitter. Another advantage is an increase in the power density at the PV cell, to match the power capability of the cell, thus increasing the efficiency of the cell and requiring a smaller cell area. Mirror 835 returns energy not incident on PV cell 830 to PBG 820.

Figure 9:
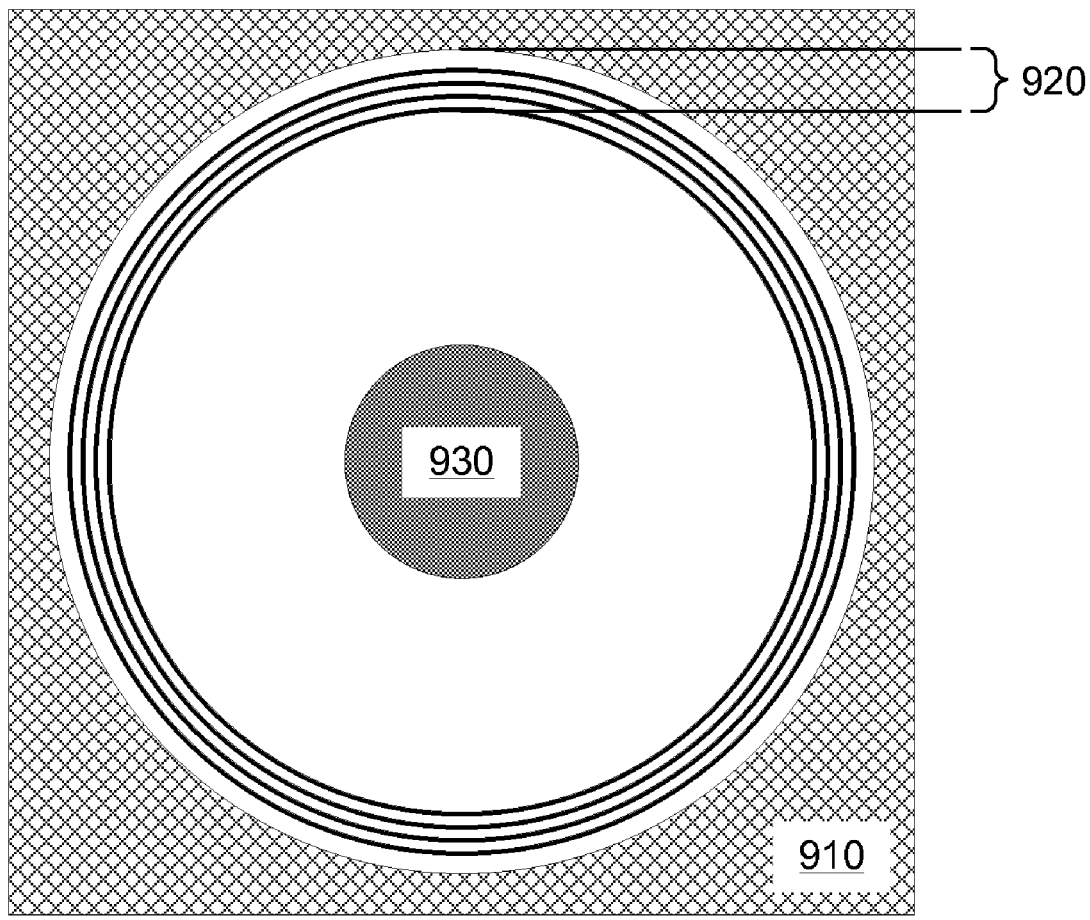
FIG. 9 is a diagram illustrating a heat exchanger.

FIG. 9 is a diagram illustrating a heat exchanger 900. Substrate 910 and PBG 920 are similar to substrate 810 and PBG 820. PBG 920 covers the interior concave surface of substrate 910 and energy is focused on heat collection element 930. Heat collection element is preferred to be a black body absorber or a PBG absorber and cannot be substantially reflective at the emission wavelengths of PBG 920. The resulting temperature of 930 is higher than substrate 910 due to the geometric concentration of optical energy and due to the selective emission and reflectance spectrum of PBG 920. Substrate 910 and heat collection element 930 are heated and cooled by a thermal transfer fluid.

Figure 10:
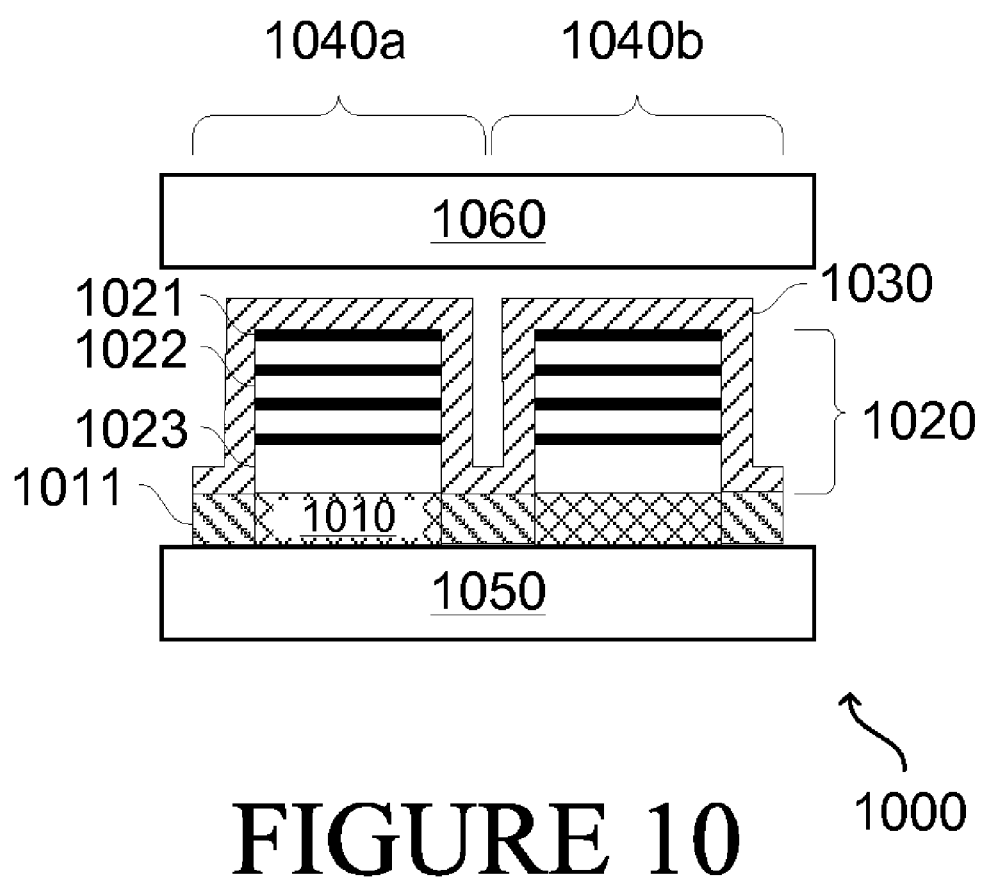
FIG. 10 is a diagram illustrating an electronic display.

FIG. 10 is a diagram illustrating an electrically color tunable emitter 1000. One or more layers 1021, 1022, or 1023 include piezoelectric materials, forming an actuated PBG 1020. Individually addressable contacts 1010 form an electrode and a rear mirror for actuated PBG 1020. Insulator 1011 prevents reference electrode 1030 from shorting PBG 1020. Collimator 1060 limits color change due to viewing angle, as the light chromaticity of any PBG is not constant with viewing angle. Substrate 1050 must be heated for a thermally emissive device. Alternatively, the substrate may not be heated and the device operated in a reflective mode. Multiple pixels 1040 are patterned to form an electronic display. Optionally, each pixel may be individually heated for brightness control. Advantages include manufacture of only one color of pixel, no masking between colors, no phosphors, increased resolution of monochromatic displays, true color displays, and IR displays. In an alternate embodiment, a magnetic material is substituted for a piezoelectric material. In an alternative embodiment, tunablity is accomplished by shifting the dielectric constant. Alternatively, the display may not be pixelated and used as an electronically color changeable light source. Uses include architectural or decorative lighting.

The device is operated by varying the color of a selected pixel to a desired value by piezoelectrically changing the dimensions of the PBG. Thus, red, green, and blue pixels, and any other desired color, are readily produced. A black may be produced by shifting the color to the IR or UV. Pulse width modulation between a visible color and black shifts the apparent brightness. In an alternative embodiment, each pixel is individually heated to control brightness level.

Figure 11:
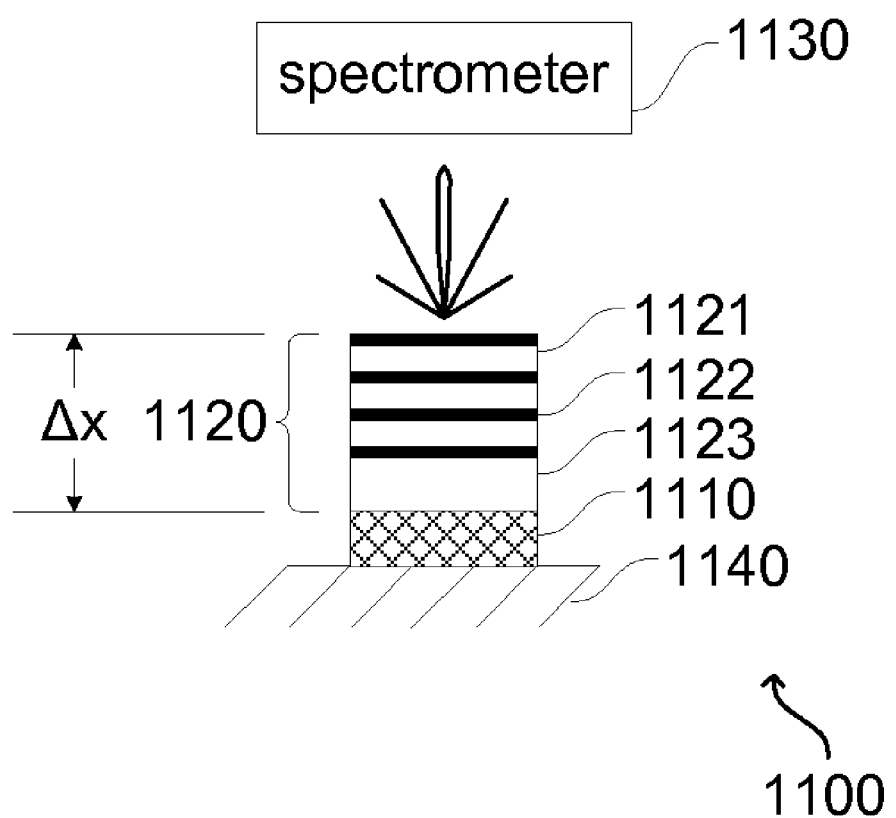
FIG. 11 is a diagram illustrating a sensor; in accordance with the present invention.

FIG. 11 is a diagram illustrating a sensor 1100. Reflective layer 1110 is attached to the object to be sensed. For sensing temperature, one or more layers 1121, 1122, and 1123 of PBG 1120 is selected to include a material with a high Coefficient of Thermal Expansion (CTE). Thus, the thickness of PBG 1120, and thus its central emissive wavelength is a function of temperature. This wavelength is read by spectrometer 1130. Substrate 1140 may be an irregular shape. Sensor 1100 is remotely readable, capable of withstanding high temperatures, presents little mass or aerodynamic load to the device being measured, and is capable of operation in corrosive, toxic, or explosive environments. Another advantage is the sensor is emissive, eliminating the need for a probe beam and allowing operation under dusty and dirty conditions.

In a further embodiment, one spectrometer 1130 reads multiple sensors 1100. For example, a sensor may be placed on each blade in a turbine. Rotation of the blades switches the view of spectrometer 1130 between multiple sensors 1100. Covering an entire blade with sensor 1100 allows a complete measurement of the temperature profile across a blade. Complete accurate temperature profiling of irregular moving surfaces is simply not possible with other technologies. Different wavelengths of sensors may be placed on different blades, to key the collected data to a particular blade.

One potential drawback of temperature sensitive PBG 1120 is that it also inherently measures strain. This limitation may be overcome by placing 2 sensors nearby, one with a large CTE and the other with a small CTE, giving two measurements to solve for both temperature and strain. Using a spectrometer modified for high speed operation, vibration is indicated by changes in strain. In yet another alternate embodiment, electric, magnetic, or chemicals may be sensed by selection of the desired materials.

What is claimed is:

1. A structure including:
   a topographically-varied substrate;
   a multitude of thin film layers directly deposited on top of said substrate;
   where said layers are of alternating high and low dielectric function;
   said structure is thermally heated to emit light at visible wavelengths.

2. The structure of claim 1, where said structure also includes one or more of the following layers:
   an index matching layer; and
   a cavity layer.

3. The structure of claim 1, where the thickness of said multitude of layers is varied between different locations on said substrate.

4. The structure of claim 3, where said thickness gradation is a continuous function.

5. The structure of claim 1, where an area of said structure has a low emissivity.

6. The structure of claim 1, where
   said substrate is a wire filament; and
   said structure is packaged in a bulb.

7. The structure of claim 1, where said structure is concave and a photovoltaic cell is positioned near the focal point of said substrate; and
   said emissions are predominantly at a slightly higher energy than the bandgap of said PV cell.

8. The structure of claim 1, where said substrate has an interior volume with said layers on the interior of said substrate; and
   a heat collection element is positioned near the center of said substrate.

9. The structure of claim 1, where one or more of said layers possess a piezoelectric response;
   where the wavelength of said emissions is proportional to an applied electric field.

10. The structure of claim 1, where one or more of said layers possess a high thermal coefficient of expansion;
    where the wavelength of said emissions is proportional to temperature.

11. A means to generate wavelength selective thermal emissions including:
    a topographically-varied substrate;
    a multitude of periods of thin film layers possessing contrasting dielectric functions directly contacting said substrate;
    where said structure is heated to visibly incandesce.

12. The light emitting means of claim 11, where said structure also incorporates one or more of:
    a cavity layer, a mirror layer, and an index matching layer.

13. The light emitting means of claim 11, further including a means to shape the emission spectrum of said thermal emissions including a variation of the thickness of one or more said layers.

14. The light emitting means of claim 13, where said thickness variation includes a continuous variation of said thickness.

15. The light emitting means of claim 11, further including a means to limit emissions from areas of unwanted emission of said structure where one or more low emissivity areas are interposed between said emissive areas.

16. The light emitting means of claim 11, further includes packaging said structure in a plastic enclosure.

17. The light emitting means of claim 11, further including a means to focus said thermal emissions including a concave substrate.

18. The light emitting means of claim 11, further including a means to shift the wavelength of the dominant emission including:
    altering the thickness of one or more said layers.

19. The light emitting means of claim 11, further including a means to shift the wavelength of the dominant emission, where said means includes altering the thickness of one or more said layers in response to a physical variable, including:
    a high CTE material to respond to changes in temperature or a deformable material to respond to changes in strain.

20. The light emitting means of claim 19, further including a means to improve the cross-correlation of two or more physical variables, including:
    temperature, strain, or other physical variable; utilizing two or more sensors with different cross-correlation functions of temperature, strain, or other physical variable.

21. A method of fabricating wavelength selective thermal emitters utilizing periodic dielectric structures on non-planar substrates including:
    a shaped substrate;
    fabricating a periodic stack of thin films of alternating high and low dielectric function directly on top of said substrate; and
    heating said substrate to visibly incandesce.

22. The method of claim 21, where said substrate is a wire filament.

23. The method of claim 21, where the thickness of said stack of thin films is varied across said substrate.

24. The method of claim 22, where said wire filament is packaged into a plastic bulb.

25. The method of claim 22, where multiple redundant said wire filaments are packaged into a single bulb; and
    only one filament is heated at any given time.

26. The method of claim 21, where said substrate is geometrically shaped to self-focus emitted energy onto an area smaller than said emitter.

27. The method of claim 21, where the layer thickness of one or more layers is dynamically adjusted.

28. The structure of claim 6, where multiple redundant filaments are packaged in a single bulb.

29. The light emitting means of claim 11, where said substrate is a wire filament.

* * * * *